US007620850B2

(12) United States Patent
Lev et al.

(10) Patent No.: US 7,620,850 B2
(45) Date of Patent: Nov. 17, 2009

(54) BREAKPOINTS IN A TRANSACTIONAL MEMORY-BASED REPRESENTATION OF CODE

(75) Inventors: Yosef Lev, Cambridge, MA (US); Mark S. Moir, Hampton, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 397 days.

(21) Appl. No.: 11/552,884

(22) Filed: Oct. 25, 2006

(65) Prior Publication Data
US 2008/0010532 A1 Jan. 10, 2008

Related U.S. Application Data

(60) Provisional application No. 60/804,410, filed on Jun. 9, 2006.

(51) Int. Cl.
*G06F 11/00* (2006.01)
(52) U.S. Cl. .......................................... 714/35
(58) Field of Classification Search ................... 714/35
See application file for complete search history.

(56) References Cited

U.S. PATENT DOCUMENTS

| | | | |
|---|---|---|---|
| 2004/0015642 A1 | 1/2004 | Moir et al. | |
| 2005/0216701 A1* | 9/2005 | Taylor | 712/34 |
| 2006/0064677 A1* | 3/2006 | Bickson et al. | 717/124 |
| 2006/0294326 A1* | 12/2006 | Jacobson et al. | 711/156 |
| 2007/0055960 A1* | 3/2007 | Damron et al. | 717/131 |
| 2008/0178160 A1* | 7/2008 | Brock et al. | 717/129 |

OTHER PUBLICATIONS

U.S. Appl. No. 10/915,502 entitled "Hybrid Software/Hardware Transactional Memory", filed Aug. 10, 2004.
Harris, T., et al., "A Practical Multi-Word Compare-and-Swap Operation", in Proceedings of the 16th International Symposium on DIStributed Computing (2002), pp. 265-279.
Herlihy, M., et al., "Software Transactional Memory for Dynamic Data Structures", in Proceedings of the 22nd Annual ACM Symposium on Principles of Distributed Computing (2003).
Lev, Y., et al., "Towards a Safer Interaction with Transactional Memory by Tracking Object Visibility", in Workshop on Synchronization and Concurrency in Object-Oriented Languages (SCOOL) (Oct. 2005).

(Continued)

*Primary Examiner*—Scott T Baderman
*Assistant Examiner*—Yair Leibovich
(74) *Attorney, Agent, or Firm*—Robert C. Kowert; Meyertons, Hood, Kivlin, Kowert & Goetzel, P.C.

(57) ABSTRACT

Transactional programming promises to substantially simplify the development and maintenance of correct, scalable, and efficient concurrent programs. Designs for supporting transactional programming using transactional memory implemented in hardware, software, and a mixture of the two have emerged recently. However, certain features and capabilities that would be desirable for debugging programs executed using transactional memory are absent from conventional debuggers. Breakpointing is one example of a capability not well supported when conventional debugging technology is applied to transactional memory. We describe techniques by which a debugger may instrument code (or by which a TM library may provide functionality) to direct execution of an atomic block to a code path that facilitates breakpoint handling.

25 Claims, 8 Drawing Sheets

OTHER PUBLICATIONS

Lewis, B., "Debugging Backwards in Time", in Proceedings of the Fifth International Workshop on Automated Debuggin (AADEBUG 2003), Sep. 2003.

Narayanasamy, S., et al., "BugNet: Continuously Recording Program Execution for Deterministic Replay Debugging" in Proceedings of the 32nd International Symposium on Computer Architecture 1063-6897 IEEE 2005, 12 pages.

Rajwar, R., et al., "Virtualizing Transactional Memory", in Proceedings of the 32nd International Symposium on Computer Architecture (ISCA'05) IEEE 2005, 12 pages.

Kumar, S., et al., "Hybrid Transactional Memory", in Proceedings of the eleventh ACM SIGPLAN symposium on Principles and practice of parallel programming, Mar. 29-31, 2006, ACM, New York, NY, 12 pages.

Afek, Y., et al., "Atomic Snapshots of Shared Memory", Journal of the Association for Computing Machinery, vol. 40, No. 4, Sep. 1993, ACM, New York, NY, pp. 873-890.

Srinivasan, S.M., et al., "Flashback: A Lightweight Extension for Rollback and Deterministic Replay for Software Debugging", Proceedings of the General Track: 2004 USENIX Annual Technical Conference, Jun. 27-Jul. 2, 2004, 15 pages.

SIMICS Hindsight "Time is Now on your Side", Virtutech White Paper, Mar. 2005, 9 pages.

Lev, Y., "Debugging with Transactional Memory", in proceedings of the First ACM SIGPLAN Workshop on Languages, Compilers, and Hardware Support for Transactional Computing (TRANSACT 2006), Ottawa, Canada, Jun. 11, 2006, 10 pages.

Lev, Y., "Debugging with Transactional Memory", in proceedings of the First ACM SIGPLAN Workshop on Languages, Compilers, and Hardware Support for Transactional Computing (TRANSACT 2006), Ottawa, Canada, Jun. 11, 2006, Presentation slides, 41 pages.

"12 Great Reasons why Etnus TotalView is the World's Best C/C++ Debugger", ETNUS TotalView® The most advanced debugger on Linux and UNIX, © 2003 Etnus, 2 pages.

"Debugging Memory Problems using TotalView" Version 8.0, © 2006 Etnus LLC.

* cited by examiner

BREAKPOINTS IN A TRANSACTIONAL MEMORY-BASED REPRESENTATION OF CODE

CROSS-REFERENCE TO RELATED APPLICATION(S)

This application claims benefit under 35 U.S.C. §119(e) of Application No. 60/804,410, filed on Jun. 9, 2006.

This application is related to U.S. application Ser. No. 11/552,895, entitled "VIEWING AND MODIFYING TRANSACTIONAL VARIABLES" and naming Yosef Lev, Mark S. Moir, and Maurice P. Herlihy as inventors; Ser. No. 11/552,890, entitled "ATOMIC GROUPS FOR DEBUGGING" and naming Yosef Lev and Mark S. Moir as inventors; Ser. No. 11/552,903, entitled "WATCHPOINTS ON TRANSACTIONAL VARIABLES" and naming Yosef Lev and Mark S. Moir as inventors; and Ser. No. 11/552,907, entitled "DELAYED BREAKPOINTS" and naming Yosef Lev and Mark S. Moir as inventors, each filed on even date herewith.

BACKGROUND

1. Field of the Invention

The present invention generally relates to the field of computers. More specifically, the present invention relates to debugging.

2. Description of the Related Art

In concurrent software it is often important to guarantee that one thread cannot observe partial results of an operation being executed by another thread. This guarantee is necessary for practical and productive software development, because it is difficult to reason about the interactions of concurrent threads without the guarantee.

In conventional software practice, this guarantee is typically provided by using locks to prevent other threads from accessing the data affected by an ongoing operation. Such use of locks gives rise to a number of well-known problems, both in terms of software engineering and in terms of performance.

Transactional memory (TM) allows the programmer to think as if multiple memory locations can be accessed and/or modified in a single atomic step. Thus, in many cases, it is possible to complete an operation with no possibility of another thread observing partial results, even without holding any locks. This significantly simplifies the design of concurrent programs. In particular, programmers are relieved of the burden of deciding which locks must be held and when the locks must be held in order to ensure correctness. Transactional memory also relieves the burden of the complexity introduced by the need to avoid deadlock and to achieve scalable performance. Transactional memory can be implemented in hardware, with the hardware directly ensuring that a transaction is atomic, or in software that provides the "illusion" that the transaction is atomic, even though in fact it is executed in smaller atomic steps by the underlying hardware. Recently, substantial progress has been made in making software transactional memory (STM) practical. Nonetheless, there is a growing consensus that at least some hardware support for transactional memory is desirable, and several proposals for supporting TM in hardware (HTM) have emerged. Recently, Hybrid TM (HyTM) has been proposed, which provides a fully functional STM implementation that can exploit best-effort HTM support to boost performance if HTM support is available and when the HTM is effective. Relieving hardware designers of the burden of handling all transactions in hardware allows them to consider a much wider range of designs, and in particular allows them to provide significant benefit with simple designs that handle the common case efficiently, while leaving difficult and/or uncommon cases to the software.

The TM designs (HTM, STM, or HyTM) proposed to date do not address the issue of debugging programs that use them. While TM promises to substantially simplify the development of correct concurrent programs, it is clear that programmers will still need to debug code while it is under development.

Debugging poses challenges for all forms of TM. If HTM is to provide support for debugging, it will be even more complicated than current proposals. STM provides the "illusion" that transactions are executed atomically, while in fact they are implemented by a series of smaller steps. If a standard debugger were used with an STM implementation, it would expose this illusion, creating significant confusion for programmers, thus severely undermining the main advantage of transactional programming. HyTM is potentially susceptible to both challenges.

SUMMARY

It has been discovered that execution of an atomic block can be directed to a different code path for breakpointing in a transactional memory-based representation of a code. When a breakpoint is set on an operation in an atomic block, a debugger can instrument code or leverage methods or functions in a transactional memory library to disable a code path for the atomic block that does not support breakpointing that allows a user to reason about behavior of a code. For example, a breakpoint may be set on an operation in an atomic block to be executed with hybrid transactional memory. If hardware does not support breakpoints, then the debugger will disable the hardware code path to direct the atomic block to be executed as a software transaction.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF EMBODIMENT(S)

Figure 1:
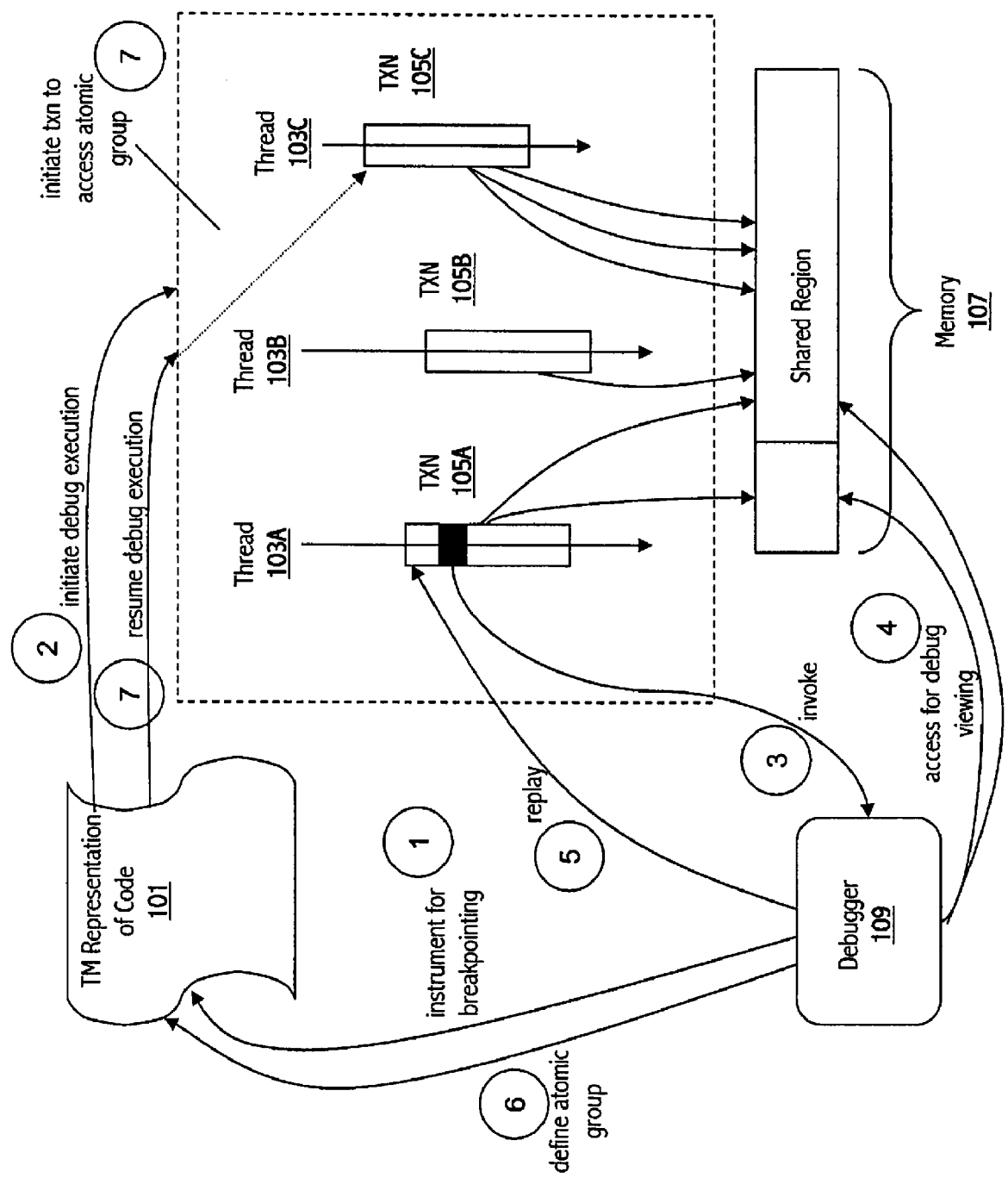
FIG. 1 depicts an example sequence of operations that may be performed by an example transactional memory debugger.

The description that follows includes exemplary systems, methods, techniques, instruction sequences and computer program products that embody techniques of the present invention. However, it is understood that the described invention may be practiced without these specific details. For instance, the examples assume a transactional memory implementation that utilizes an ownership record for multiple transactional locations, even though an implementation may employ an ownership record for each transactional location. In other instances, well-known instruction instances, protocols, structures and techniques have not been shown in detail in order not to obfuscate the description.

Overview of Transactional Memory

A HyTM system comprises a compiler, a library for supporting transactions in software, and (optionally) HTM support. Programmers express blocks of code that should (appear to) be executed atomically in some language-specific notation. The embodiments do not depend on a particular language or notation for expressing atomic blocks. For illustrative purposes, we assume a simple notation such as:

```
atomic {
    ...
    code to be executed atomically
    ...
}
```

For each such atomic block, the compiler produces code to execute the code block atomically using transactional support. An example HyTM approach is to produce code that attempts to execute the block one or more times using HTM. If attempts to execute the block using HTM do not succeed, then the example HyTM approach repeatedly attempts to execute the atomic block using the STM library.

The compiler will also typically produce "glue" code that hides this retrying from the programmer, and invokes "contention management" mechanisms when necessary to facilitate progress. Such contention management mechanisms may be implemented, for example, using special methods in the HyTM software library. These methods may make decisions such as whether to "back off" and for how long before retrying after a transaction fails. Furthermore, contention management mechanisms may make decisions such as whether a transaction that encounters a potential conflict with a concurrent transaction should a) abort itself, b) abort the other transaction, or c) wait for a short time to give the other transaction an opportunity to complete. As we will see, debuggers may need to interact with contention control mechanisms to provide a meaningful experience for users.

It should be noted that the term "transaction" denotes an executing instance of an atomic block, regardless of which type of TM is attempting to execute the atomic block. It should also be noted that different transactions might be execution attempts of the same atomic block.

Because the above-described approach may result in the concurrent execution of transactions in hardware and in software, correct interaction of these different types of transactions should be ensured. With the HyTM approach, the compiler emits additional code for a hardware transaction. The emitted code examines structures maintained by software transactions in order to detect any potential conflict between the hardware transaction and the software transactions. In case such a conflict is detected, the hardware transaction is generally aborted, and is subsequently retried, either in hardware or in software.

Transactional Execution

As a software transaction executes, it acquires "ownership" of each memory location that it accesses: exclusive ownership in the case of locations modified, and possibly shared ownership in the case of locations read but not modified. In some implementations (particularly those that employ a "visible reads" approach in which the identities of transactions that own a given location are available), ownership cannot be revoked while the owning transaction is in the active state. Accordingly, in such implementations, a second transaction that wishes to acquire ownership of a location already owned by the first transaction must first abort the transaction by changing its status to aborted.

A location can be modified only by a transaction that owns it. However, in a typical implementation, the transaction "buffers" its modifications in a "write set" rather than modifying the locations directly while executing. Thus, if a transaction reaches its end without being aborted, then all of the locations it accessed have maintained the same values since they were first accessed. The transaction atomically switches its status from active to committed, thereby logically applying the changes in its write set to the respective memory locations it accessed. Before releasing ownership of the modified locations, the transaction copies back the values from its write set to the respective memory locations so that subsequent transactions acquiring ownership of these locations see the new values.

While transactional memory implementations that employ a "visible reads" approach provide a useful descriptive context, it is important to note that in some implementations of transactional memory, the identities of transactions that own a given location may not be available (at least to other transactions). Such implementations are referred to throughout this description. In general, our techniques are applicable to both approaches; however, certain variations on our basic techniques for such "invisible reads" implementations are appropriate and described herein. For example, relative to the preceding description, transactional memory implementations that take an invisible reads approach may employ a slightly different approach to acquisition and revocation of read ownership. In such implementations, read ownership can be revoked while the owning transaction is still in an active state. The transaction is then responsible for checking that it still owns its locations in read-mode when committing.

As described above, implementations of transactional memory often take a buffered write set approach to tentative values in which the transaction "buffers" its modifications in a "write set" rather than modifying the owned locations directly. While write set approaches provide a useful descriptive context, it is (again) important to note that in some implementations of transactional memory alternative techniques may be employed. In particular, an undo set approach may be employed in some embodiments in accordance with the present invention and the techniques we describe are generally applicable in such transaction memory implementations as well. For reference (and as described elsewhere herein), undo set approaches write tentative values in-place in memory and keep an "undo set" with old (pre-transactional) values to be copied to memory if the transaction aborts. Based on the description herein, persons of ordinary skill in the art will appreciate variations suitable for both "write set"- and "undo set"-based approaches.

Ownership

In the example word-based HyTM scheme described herein, there is an ownership record (henceforth orec) associated with each transactional location (i.e., each memory location that can be accessed by a transaction). To avoid the excessive space overhead that would result from dedicating one orec to each transactional location, we instead use a special orec table. Each transactional location maps to one orec in the orec table, but multiple locations can map to the same orec. To acquire ownership of a transactional location, a transaction acquires the corresponding orec in the orec table. Numerous techniques can be utilized to represent and maintain ownership records. An orec contains an indication of whether it is owned, and in some embodiments, whether it is owned in "read" or "write" mode. These indications are leveraged in instrumenting a hardware transaction to detect conflicts with software transactions. For each memory access in an atomic block to be executed in hardware, the compiler emits additional code to lookup the corresponding orec and determine whether there is (potentially) a conflicting software transaction. If so, the hardware transaction aborts itself. By storing an indication of whether the orec is owned in read or write mode, we allow a hardware transaction to succeed even if it accesses one or more memory locations in common with one or more concurrent software transactions, provided none of the transactions modifies these locations.

Atomicity

As described above, the illusion of atomicity is provided by considering the updates made by a transaction to "logically" take effect at the point at which it commits, known as the transaction's linearization point. In some implementations (e.g., in the simple "visible reads"-based implementations described above), a transaction's linearization point will be the point at which its status changes from active to committed. In implementations in which a transaction is responsible for checking that it still owns its locations in read-mode when committing, the beginning of the check is the linearization point (assuming that the transaction successfully commits). By preventing transactions from observing the values of transactional locations that they do not own, the fact that the changes to these locations are in fact made one by one after the transaction has already committed is hidden. If we use such an STM or HyTM package with a conventional debugger, the debugger will not respect these ownership rules. Therefore, for example, it might display a pre-transaction value in one memory location and a post-transaction value in another location that is updated by the same transaction. This would "break" the illusion of atomicity, which would severely undermine the user's ability to reason about the program.

Furthermore, a standard debugger would not deal in meaningful ways with the multiple code paths used to execute transactions in hardware and in software, or library calls for supporting software transactions, contention management, etc.

Debug Modes

Although persons of ordinary skill in the art will appreciate other modes based on the description herein, for purposes of illustration, we concentrate on three basic debug modes/variations:

Unsynchronized Debugging: when a thread stops (when hitting a breakpoint, for example), the rest of the threads keep running.

Synchronized Debugging: if a thread stops, the rest of the threads also stop with it. Two variations on synchronized debugging modes are significant:

Concurrent Stepping: when the user requests the debugger to run one step of a thread, the rest of the threads also run while this step is executed (and stop again when the step is completed, as this is a synchronized debugging mode).

Isolated Stepping: when the user requests the debugger to run one step of a thread, only that thread's step is executed.

For simplicity, it is assumed that the debugger is attached to only one thread at a time, which is denoted as the debugged thread. If the debugged thread is in the middle of executing a transaction, this transaction is denoted as the debugged transaction. When a thread stops at a breakpoint, it automatically becomes the debugged thread. Note that with the synchronized debugging modes, after hitting a breakpoint the user can choose to change the debugged thread, by switching to debug another thread. It should be appreciated embodiments are not limited to these three debug modes and that embodiments are compatible with a variety of other debug modes. For example, a group of threads can be defined as working in concurrent stepping mode while the rest of the threads remain stopped. Furthermore, multiple threads may have a debugger attached simultaneously.

Example Transactional Memory Debugger

FIG. 1 depicts an example sequence of operations that may be performed by an example transactional memory debugger. In FIG. 1, a transactional memory compiler has generated a transactional memory-based representation of code 101. A debugger 109 instruments the code 101 for breakpointing, and then initiates debug execution of the code 101. In this example, execution of the code 101 produces threads 103A and 103B. The threads 103A and 103B respectively include transactions 105A and 105B. A debugger trigger has been set in the transaction 105A. The debug trigger may correspond to any one of a breakpoint, a delayed breakpoint, a watchpoint, etc. The debug trigger causes invocation of the debugger 109. To support viewing of transactional variables (i.e., variables accessed by one or more transactions), debugger 109 interacts with memory 107 using accesses that provide visibility into the multiple values (e.g., tentative and pre-transaction values) that may exist for a given transactional variable.

In FIG. 1, the debugger accesses a shared region and a private region of the memory 107. A user requests replay of the transaction, so the debugger 109 causes the transaction 105A to be replayed from the beginning. A user then requests that group of variables be defined as an atomic group. Therefore, the debugger 109 instruments the code 101 to define an atomic group for the user. The debugger 109 resumes debug execution of the code 101. The instrumentation for defining the atomic group causes a thread 103C to be produced that includes a transaction 105C. The transaction 105C accesses the group of variables as an atomic group as requested by the user. It should be kept in mind that the above example use of a TM debugger was merely to aid in understanding the embodiments, and not meant to be limiting.

Breakpointing

The ability to stop the execution of a program (using, for example, a breakpoint) and to run the debugged thread step by step is a typical feature of a debugger. In a program that contains atomic blocks, a breakpoint will sometimes reside in an atomic block. When placing a break point in an atomic block of code, a debugger operating on a HyTM representation of a code that includes the atomic block, negotiates the possibility that the atomic block may have multiple implementations (for example, one that uses HTM and another that uses the STM library).

Figure 2:
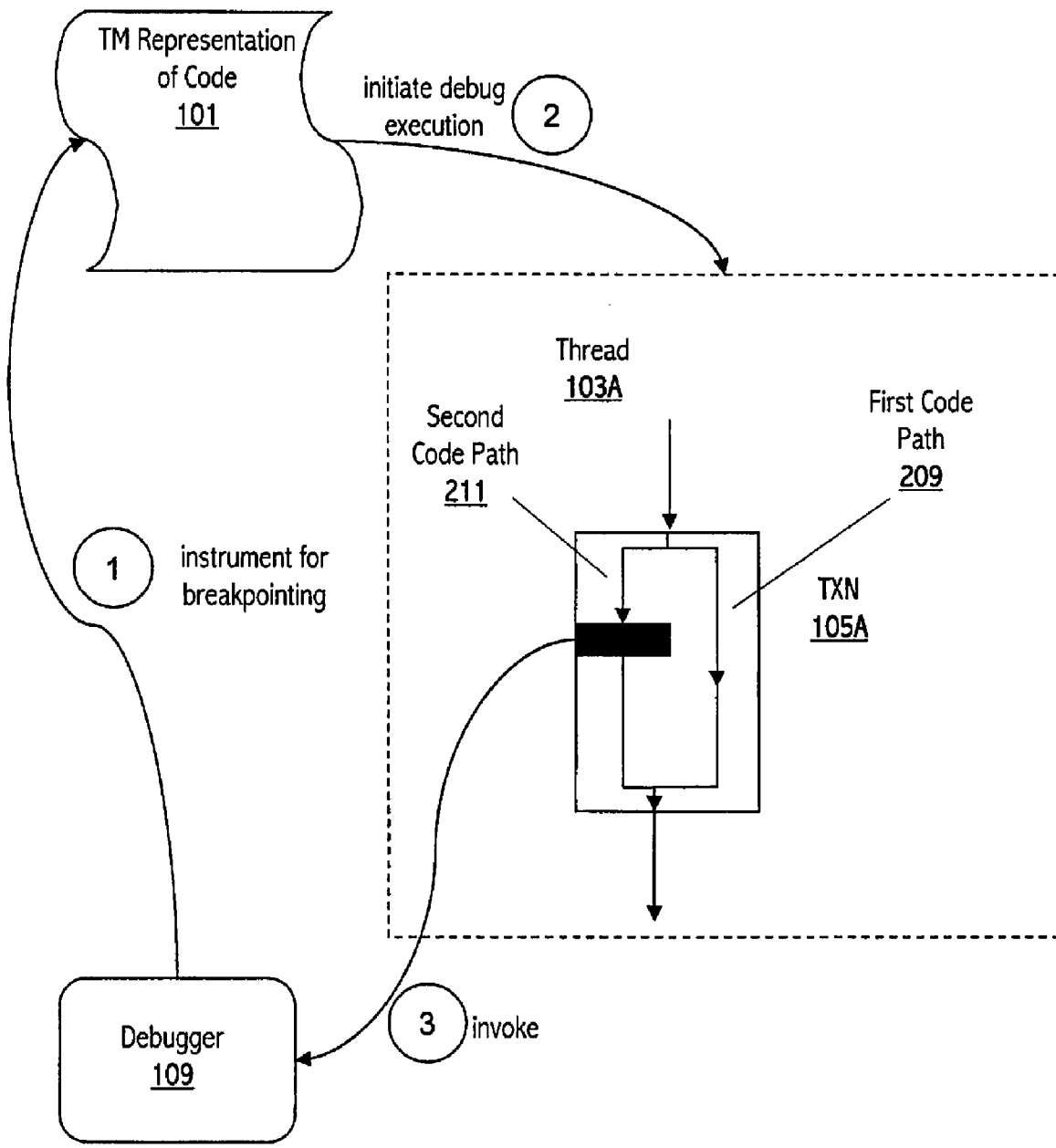
FIG. 2 depicts an example of debug execution of a code with a breakpoint set on an operation in an atomic block of the code.

FIG. 2 depicts an example of debug execution of a code with a breakpoint set on an operation in an atomic block of the code. In FIG. 2, the debugger 109 instruments the transactional memory representation of the code 101. The debugger 109 then initiates debug execution of the code 101. The thread 103A, which includes the transaction 105A, begins executing. However, the instrumenting by the debugger to set the breakpoint in the atomic block for the transaction 105A causes the transaction 105A to be directed to a second code path 211, instead of a first code path 209. For example, a hardware code path is disabled, thus causing the transaction 105A to be executed as a software transaction. When the breakpoint is encountered in the second code path 211, the debugger 109 is invoked. Directing execution of a transaction to a different code path may coincide with encountering the breakpoint, determining that a breakpoint has been set within an atomic block, etc.

If the user sets a breakpoint inside an atomic block, in order to debug that atomic block, the debugger disables the code path that attempts to execute this atomic block using HTM. However, we do not want to disable all use of HTM, because we wish to minimize the impact on program timing in order to avoid masking bugs, for example.

Therefore, the HTM code path for an atomic block is disabled (forcing that atomic block to be executed as a software transaction) if a breakpoint is placed in that block. This disabling can be achieved in a variety of ways. One approach is to modify the code for the atomic block so that it branches unconditionally to the software path, rather than attempting the hardware transaction. In HyTM schemes in which the decision about whether to try to execute an atomic block as a hardware transaction or a software transaction is made by a method in the software library, the atomic block code is modified to omit this call and branch directly to the software code path. In another example, the debugger is provided with an interface to the software library so that it can instruct the method of the software library to always choose the software path for a given atomic block.

In some cases, it may be desirable to modify the HTM code path to abort the hardware transaction if and when a breakpoint is encountered. The atomic block will eventually be executed using the STM code path. In this way, transaction processing may be may be directed to the STM code path where breakpoint handling may be conveniently provided.

In addition to disabling the hardware code path, we also enable the breakpoint in the software code path. First, the correspondence between the source code and the STM-based implementation of an atomic block differs from the usual correspondence between source and assembly code: the STM-based implementation uses the STM library functions for read and write operations in the block, and may also use other function calls to correctly manage the atomic block execution. For example, it is sometimes necessary to invoke a STM-Validate method in the STM library in order to verify that the values read by the transaction so far represent a consistent state of the memory. The following example codes show an example of an STM-based representation of a simple atomic block. In particular, following simple atomic block:

```
atomic {
    v = node->next->value;
}
``` may be implemented as the following STM-based representation:

```
while(true) {
    tid = STM-begin-tran( );
    tmp = STM-read(tid, &node);
    if (STM-Validate(tid)) {
        tmp = STM-read(tid, &(tmp->next));
```

-continued

```
        if (STM-Validate(tid)) {
            tmp2 = STM-read(tid, &(tmp->value));
            STM-write(tid, &v, tmp2);
        }
    }
    if (STM-commit-tran(tid)) break;
}
```

The debug information generated by the compiler reflects this special correspondence to support a meaningful debugging view to users. When the user is stepping in source-level mode, all of these details are hidden, just as assembly-level instructions are hidden from the user when debugging in source mode with a standard debugger. However, when the user is stepping in assembly-level mode, all STM function calls are visible to the user, but should be regarded as atomic assembly operations: stepping into these functions should not be allowed.

Another factor is that control may return to the beginning of an atomic block if the transaction implementing it is aborted. Without special care, this may be confusing for the user: it will look like "a step backward". In particular, in response to the user asking to execute a single step in the middle of an atomic block, control may be transferred to the beginning of the atomic block (which might reside in a different function or file). In such cases, the debugger may prompt the user with a message indicating that the atomic block execution has been restarted due to an aborted transaction. Depending on how control is transferred to the beginning of an atomic block upon failed validation, this functionality may be supported in a variety of ways. For example, the debugger may arrange for this prompt to be displayed on the code path after the STM-Validate method returns false, or the debugger may be provided with an interface to the STM library, allowing it to instruct the STM library to display the prompt upon failed validation.

Finally, it might be desirable for the debugger to call STM-Validate right after it hits a breakpoint, to verify that the transaction can still commit successfully. This is because, with some HyTM implementations, a transaction might continue executing even after it has encountered a conflict that will prevent it from committing successfully. While the HyTM must prevent incorrect behavior (such as dereferencing a null pointer or dividing by zero) in such cases, it does not necessarily prevent a code path from being taken that would not have been taken if the transaction were still "viable". In such cases, it is probably not useful for the user to believe that such a code path was taken, as the transaction will fail and be retried anyway. The debugger can avoid such "false positives" by calling STM-Validate after hitting the breakpoint, and ignore the breakpoint if the transaction is no longer viable. In some realizations, it may be desirable to allow this checking to be enabled and disabled by a user.

The debugger may also provide a feature that allows the user to abort the debugged transaction. In some implementations, such an abort may be provided with an option to retry the atomic block from the beginning (as a new transaction). In some implementations, an option to skip over the atomic block altogether and simply resume (non-transactional) execution may be provided. In some implementations, both options may be provided. Such functionality is straightforward to provide because the compiler already includes code for transferring control for retry or commit, and because most TM implementations provide means for a transaction to explicitly abort itself.

Prioritization for Conflicts

When stepping through an atomic block, it might be useful to change the way in which conflicts are resolved between transactions, for example by making the debugged transaction win any conflict it might have with other transactions. We call such a transaction a super-transaction. This feature is useful for isolated stepping in synchronized debugging mode because the debugged thread takes steps while the rest of the threads are not executing. Therefore, there is no point in waiting in case of a conflict with another thread, or in aborting the debugged transaction. It may also be useful in other debugging modes, because it will avoid the debugged transaction being aborted, causing the "backward-step" phenomenon previously described. The utility of such a prioritization scheme becomes evident when considering how much slower the debugged thread will run than other transactions since it is being debugged, thus increasing the likelihood of being aborted.

In some STM and HyTM implementations, particularly those supporting read sharing, orecs indicate only that they are owned in read mode, and do not necessarily indicate which transactions own them in that mode. In such implementations, transactions record the orecs for which they have acquired read ownership and recheck those orecs before committing to ensure that none have changed. Supporting the super-transaction with these implementations might seem problematic, since when a transaction would like to get write ownership on an orec currently owned in read mode, it needs to know whether a super-transaction owns the orec. One simple solution is to specially mark the orecs of all locations read so far by the debugged transaction upon hitting a breakpoint, and to continue marking orecs newly acquired in read mode as the transaction proceeds. The STM library and/or its contention manager component would then ensure that a transaction never acquires write ownership of an orec that is currently owned by the super-transaction.

Finally, note that other kinds of modifications of the contention manager policy might be useful for debugging, depending on the policy used. For example, if the policy is priority based (that is, the user may assign priorities to atomic blocks), it may be useful to be able to change the atomic-block's priority on-the-fly while debugging it.

Switching between Debugged Threads

When stopping at a breakpoint, the thread that hit that breakpoint automatically becomes the debugged thread. In some cases though, the user would like to switch to debug another thread after the debugger has stopped on the breakpoint. This is particularly useful when using the isolated steps synchronized debugging mode, because in this case the user has total control over all the threads. Such control over the threads allows a user to simulate complicated scenarios of interaction between the threads by taking a few steps with each thread separately.

There are a few issues to consider when switching between debugged threads. The first relates to hardware transactions when using HyTM. Perhaps, a new debugged thread is in the middle of executing the HTM-based implementation of an atomic block. Recall that we only disable the hardware-path for some of the atomic blocks that have breakpoints, which is not necessarily the case for an atomic block executed by the new debugged thread. Depending on the HTM implementation, attaching the debugger to such a thread may cause the hardware transaction to abort. Moreover, since HTM is not assumed to provide any specific support for debugging, we will want to abort the hardware transaction anyway, and restart the atomic block's execution using the STM-based implementation. Of course, if the HTM implementation has debugging facilities, we might choose not to abort the hardware transaction and debug the transaction using that support.

Again, depending on the HTM support available, various alternatives may be available, and it may be useful to allow users to choose between such alternatives, either through configuration settings, or each time the decision is to be made. Possible actions include:
 1. Switch to the new thread aborting its transaction.
 2. Switch to the new thread but only after it has completed the transaction (successfully or otherwise). This might be implemented, for example, by appropriate placement of additional breakpoints.
 3. Cancel and stay with the old debugged thread.

Another issue to consider is the combination of the super-transaction feature and the ability to switch the debugged thread. Generally it makes sense to have only one super-transaction at a time. If the user switches between threads, it is probably desirable to:
 1. Change the previously debugged transaction back to be a regular transaction.
 2. Change the new debugged transaction to be the super-transaction.

As described above, this may require unmarking all orecs owned in read mode by the old debugged transaction, and marking those of the new one.

Viewing and Modifying Transactional Variables

Another feature typically supported by debuggers is the ability to view and modify variables when the debugger stops execution of a program. The user indicates a variable name or a memory address, and the debugger displays the value stored there and may also allow the user to change this value. As explained earlier, in various TM implementations, particularly those based on STM or HyTM approaches, the current logical value of the address or variable may differ from the value stored in it. In such cases, the debugger cannot determine a variable's value by simply reading the value of the variable from memory. The situation is more complex with value modifications—in this case, simply writing a new value to the specified variable may violate the atomicity of transactions currently accessing it. However, utilizing transactional memory allows for viewing and modifying of transactional variables.

A debugged program may contain transactional variables that should be accessed using TM and non-transactional variables that can be accessed directly using conventional techniques. A variety of techniques for distinguishing these variables exist, including type-based rules enforced by the compiler, as well as dynamic techniques that determine and possibly change the status of a variable (transactional or non-transactional) at runtime. Whichever technique is used in a particular system, the debugger is designed to take the technique into account and access variables using the appropriate method.

In general, non-transactional variables can be accessed as in a standard debugger. It should be noted, however, that in some TM systems, accessing a non-transactional variable using a transaction will not result in incorrect behavior. In such cases, one choice is to access all variables with transactions, without regard to whether they are transactional or non-transactional.

For transactional variables, one option is for the debugger to access (view and/or modify) the variable value by executing a "mini-transaction"—that is a transaction that consists of the single variable access. The mini-transaction might be executed as a hardware transaction or as a software transaction, or it may follow the HyTM approach of attempting to execute it in hardware, but retrying as a software transaction if the hardware transaction fails to commit or detects a conflict with a software transaction. If, however, the debugger has stopped in the middle of a transaction, and the variable to be accessed has already been accessed by the debugged transaction, then it is often desirable to access the specified variable from the debugged transaction's "point of view". For example, if the debugged transaction has written a value to the variable, then the user may desire to see the value it has stored (referred to herein as the "tentative value"), even though the transaction has not yet committed, and therefore this value is not (yet) the value of the variable being examined. Similarly, if the user requests to modify the value of a variable that has been accessed by the debugged transaction, then it may be desirable for this modification to be part of the effect of the transaction when it commits. To support this behavior, the variable can be accessed in the context of the debugged transaction simply by calling the appropriate library function.

Use of a mini-transaction to access a transactional variable for viewing and/or modifying instead of the debugged transaction, avoids increasing the likelihood of the debugged transaction being aborted due to a conflict, such as in an unsynchronized or a concurrent-stepping synchronized debugging mode. This is because accessing such variables using the debugged transaction increases the set of locations being access by the debugged transaction (i.e., increases the size of the access set of the debugged transaction).

In general, it is preferable that actions of the debugger have minimal impact on normal program execution. For example, we would prefer to avoid aborting transactions of the debugged program in order to display values of variables to the user. However, we must preserve the atomicity of program transactions. In some cases, it may be necessary to abort a program transaction in order to service the user's request. For example, if the user requests to modify a value that has been accessed by an existing program transaction, then the mini-transaction used to effect this modification may conflict with that program transaction. Furthermore, some STM and HyTM implementations are susceptible to false conflicts in which two transactions conflict even though they do not access any variables in common. In case the mini-transaction used to implement a user request does conflict with a program transaction, several alternatives are possible. We might choose to abort the program transaction, to wait for it to complete (in appropriate debugging modes), or to abandon the attempted modification. These choices may be controlled by preferences configured by the user, or by prompting the user to decide between them when the situation arises. In the latter case, various information may be provided to the user, such as which program transaction is involved, what variable is causing the conflict (or an indication that it is a false conflict), etc.

A STM may provide special purpose methods for supporting mini-transactions for debugging. For example, if all threads are stopped, then the debugger can modify a variable that is not being accessed by any transaction without acquiring ownership of its associated orec. Therefore in this case, if the STM implementation can tell the debugger whether a given variable is being accessed by a transaction, then the debugger can avoid acquiring ownership and aborting another transaction due to a false conflict.

Adding and Removing a Variables from a Transaction's Access Set

As described in the previous section, it is often preferable to access variables that do not conflict with the debugged transaction using independent mini-transactions. In some cases, however, it may be useful to allow the user to access a variable as part of the debugged transaction even if the transaction did not previously access that variable. This way, the transaction would take effect only if the variables viewed do not change before the transaction attempts to commit, and any modifications requested by the user would commit only if the debugged transaction commits. This approach provides the user with the ability to "augment" the transaction with additional memory locations.

Moreover, some TM implementations support early-release functionality: with early-release, the programmer can decide to discard any previous accesses done to a variable by the transaction, thereby avoiding subsequent conflicts with other transactions that modify the released variable. If early-release is supported by the TM implementation, the debugger can also support removing a variable from the debugged-transaction's access set (i.e., the set of variables accessed by the transaction).

Multiple Values for a Transactional Variable

Although when debugging an atomic block the user would usually prefer to see variables as they would be seen by the debugged transaction (i.e., as tentative value), in some cases it might be useful to see the variables as they were before the transaction began (i.e., as pre-transactional values). Note that since the debugged transaction has not committed yet, a pre-transactional value is the current logical value of the variable, as may be seen by other threads. Some STM implementations can easily provide such functionality because they record the value of all variables accessed by a transaction on the first time they are accessed. In other STM implementations, the pre-transaction value is kept in the variable itself until the transaction commits, and can thus be read directly from the variable. In such systems, the debugger can display the pre-transaction value of a variable (as well as the tentative value seen by the debugged transaction).

Figure 3:
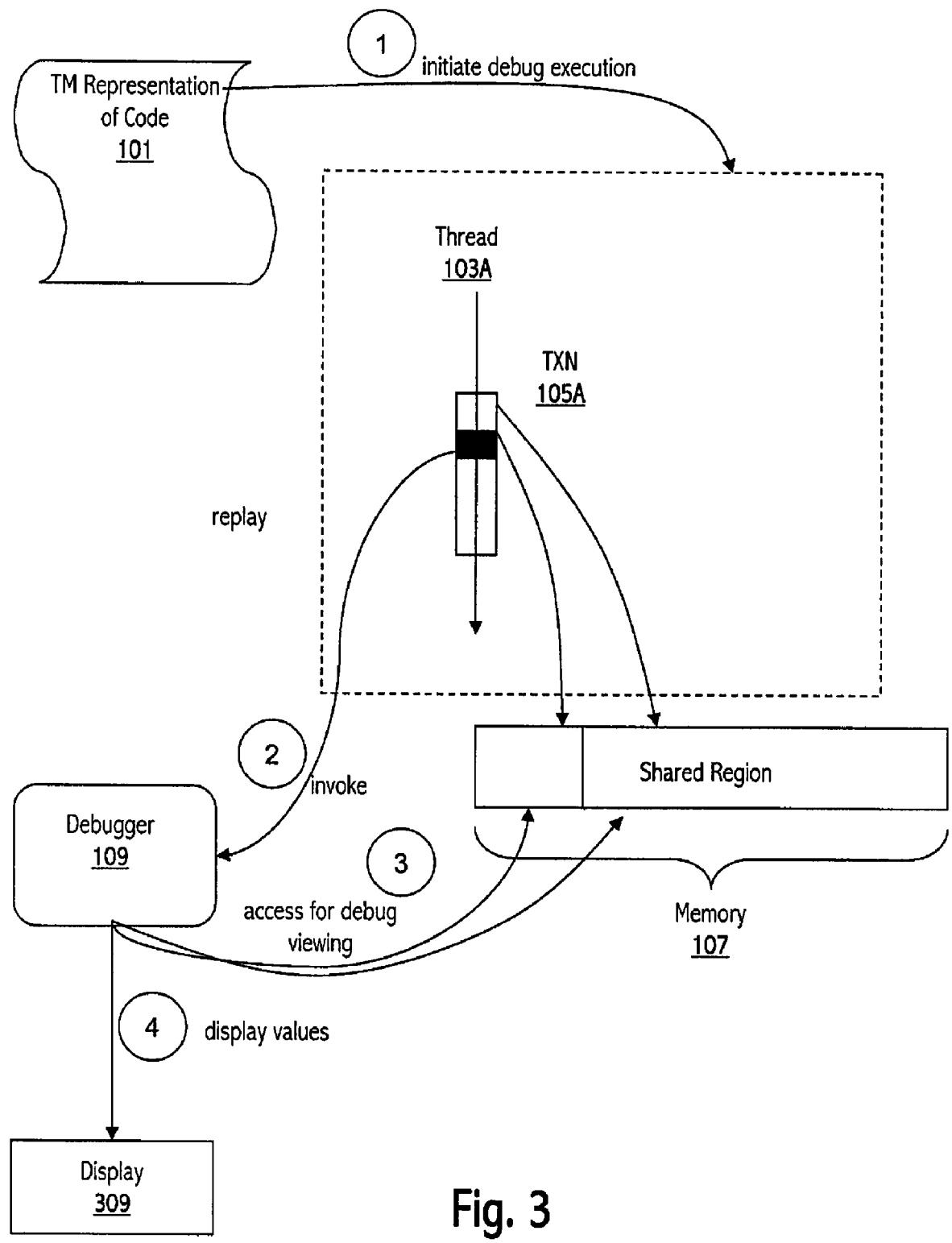
FIG. 3 depicts an example of a debugger accessing multiple values for a transactional variable.

FIG. 3 depicts an example of a debugger accessing multiple values for a transactional variable. Debugger 109 initiates execution of the transactional memory-based representation of code 101. Execution of thread 103A includes execution of transaction 105A. In the illustrated example, transaction 105A accesses both a private region and a shared region of memory 107, writing a tentative value for a transactional variable to the private region. The shared region provides storage for a pre-transaction value (i.e., a value of a variable as viewed by all other transactions prior to commit of the debugged transaction) for a transactional variable that a user wishes to view and possibly modify. Transaction 105A encounters a debugger trigger and invokes debugger 109. Debugger 109 accesses both the private region and the shared region to display a pre-transaction value and a tentative value to a user on a display 309, assuming both values exist for the particular transactional variable of interest. The illustration of FIG. 3 assumes that the viewing and/or modifying is done with the debugged transaction. However, as described above, the debugger may create a mini-transaction in the same thread 103A or in another thread to access the transactional variable.

For simplicity of illustration, we have explained a particular implementation in which some values (in this case, tentative values) reside in storage used by a particular transaction and not other transactions, while pre-transaction values reside in shared storage. In some implementations, storage used only by the particular transaction may be provided by memory that is private to a particular processor or may utilize other forms of private storage such as register storage. If desirable, shared storage may be used even for tentative values. In any case, a debugger such as debugger 109 can benefit from (and indeed for some features described herein, may require) access to both tentative and pre-transaction values, however stored.

Displaying a Variable Value from a Conflicting Transaction

In some cases, it is possible to determine the value of a variable even if it is currently being modified by another transaction. For example, some STM implementations record the pre-transaction value of a variable accessed by a transaction, while in others the variable itself contains the pre-transaction value. If the debugger can determine that the conflicting transaction's linearization point has not passed, then it can display the pre-transaction value to the user. How such a determination can be made depends on the particular STM implementation, but in many cases this is not difficult. For example, in an STM implementation that takes a visible reads approach to orec ownership, we can simply examine the status of the conflicting transaction.

Determining a consistent view of a variable's value and a transaction's status is generally straightforward. One alternative is to use a hardware transaction to read both atomically. Another is to exploit execution context. For example, if all threads are stopped by the debugger, we can simply read the relevant variable and transaction status, without fear of anything changing while we read them. A third approach is to use standard non-blocking synchronization techniques, such as rereading the transaction status (together with a version number) to determine if it changed while reading the variable's value, and to retry if so. Another potentially useful piece of information we can get from the transaction that owns the variable the user is trying to view is the tentative value of that variable. Specifically, the debugger can inform the user that the variable is currently accessed by a software transaction, and give the user both the current logical value of the variable (i.e., pre-transaction value), and its tentative value (which will be the value the variable when and if the transaction commits successfully).

Atomic Groups

In a system supporting transactions, the debugger can allow the user to define an atomic group of variables whose values are read or modified atomically. Such a feature provides a powerful debugging capability that is not available in standard debuggers: the ability to get a consistent view of multiple variables even while threads are running and potentially modifying these variables.

Implementing atomic groups using TM is done by accessing all variables in the group using one transaction. Reading the variables is done by using a single transaction that reads all variables in the group. As for modifications, when the user modifies a variable in an atomic group, the modification does not take place until the user asks to commit all modifications done to the group, at which point the debugger begins a transaction that executes these modifications atomically. Referring back to FIG. 1, the debugger 109 has allowed a user to define a group of variables as an atomic group. All of the variables in the atomic group are accessed by a transaction 105C in a thread 103C. The transactions can be managed by HTM, STM or HyTM.

The displayed values of the group's variables may not be their true value at the point the user tries to modify them. We can extend this feature with the compare-and-swap option, which modifies the values of the group's variables only if they contain the previously displayed values. This can be done by beginning a transaction that first rereads all the group's variables and compares them to the previously presented values (saved by the debugger), and only if these values all match, applies the modifications using the same transaction. If some of the values did change, the new examined value can be displayed. More sophisticated options may also be considered, like atomically modifying the group's variables by applying a specified function to them, etc. In all these cases, reading the variables, computing and storing the new values, should be done using a single transaction.

The debugger may use a similar approach when displaying a compound structure, to guarantee that it displays a consistent view of that structure. Suppose, for example, that the user views a linked list, starting at the head node and expanding it node by node by clicking on the next field of each node. In unsynchronized debugging mode, the list might be changed while it is being viewed. So, reading it node by node might display an inconsistent view of the list, which might contain, for example, non-existing loops (due to nodes that were moved from one place in the list to another). Therefore, a possible solution is to use a transaction to re-read the nodes leading to the node the user has just expanded, thereby making sure that the values displayed are consistent across the compound structure.

Watchpoints

Many debuggers available today support the ability to place a breakpoint on a memory location or a variable instead of on an operation. Such breakpoints instruct the debugger to stop on any operation that modifies this memory location. These breakpoints are usually referred to as watchpoints. More sophisticated watchpoints can also specify a predicate that must hold in order for the debugger to stop (for example, that the variable value is bigger than some number). These are sometimes referred to as conditional watchpoints.

Watchpoints are sometimes implemented using specific hardware support, for example hardware breakpoints. Persons skilled in the art, given benefit of our description below, will recognize that such support may also be exploited in a transactional memory system, for example by using hardware breakpoint ("hw-breakpoint") support to track modifications to orecs. If no hw-breakpoint support is available, some debuggers implement watchpoints in software, by executing the program step-by-step and checking the value of the watched variable(s) after each step, which results in executing the program hundreds of times slower than the normal execution.

Instead of lagging execution with conventional implementation of watchpoints, the access tracking mechanism in transactional memory system can be leveraged for an efficient implementation of watchpoints. With the access tracking mechanism, a TM representation of a code with a watchpoint can stop on a modification or even a read access to a transactional variable. Since a TM implementation keeps track of which transaction accesses which memory locations, we can use this tracking mechanism to detect accesses to specific locations. Particularly, in TM implementations that use ownership records (orecs), we can mark the orec that corresponds to the memory location we would like to watch, and invoke the debugger whenever a transaction gets ownership of such an orec. In a HyTM implementation, when the hardware code path accesses an orec to check for a possible conflict with a software transaction, it can also check for a watchpoint indication on that orec. Depending on the particular hardware TM support available, it may or may not be possible to transfer control to the debugger while keeping the transaction viable. If not, it may be desirable to abort the hardware transaction and retry the transaction in software or notify the user that the watchpoint was hit in the hardware path of the particular atomic block.

The debugger can mark an orec with either a stop-on-read or stop-on-write marking. With the first marking, the debugger is invoked whenever a transaction gets read ownership on that orec (note that some TM implementations allow multiple transactions to concurrently own an orec in read mode), and with the latter, it is invoked only when a transaction gets write ownership on that orec. When the debugger is invoked, it should first check whether the accessed variable is indeed one of the watchpoints' variables, since some STM implementations map multiple memory locations to the same orec. If the access is indeed to one of the watchpoints' variables, then the debugger should stop or, in the case of a conditional watchpoint, evaluate a predicate to decide whether it should stop or not.

Figure 4:
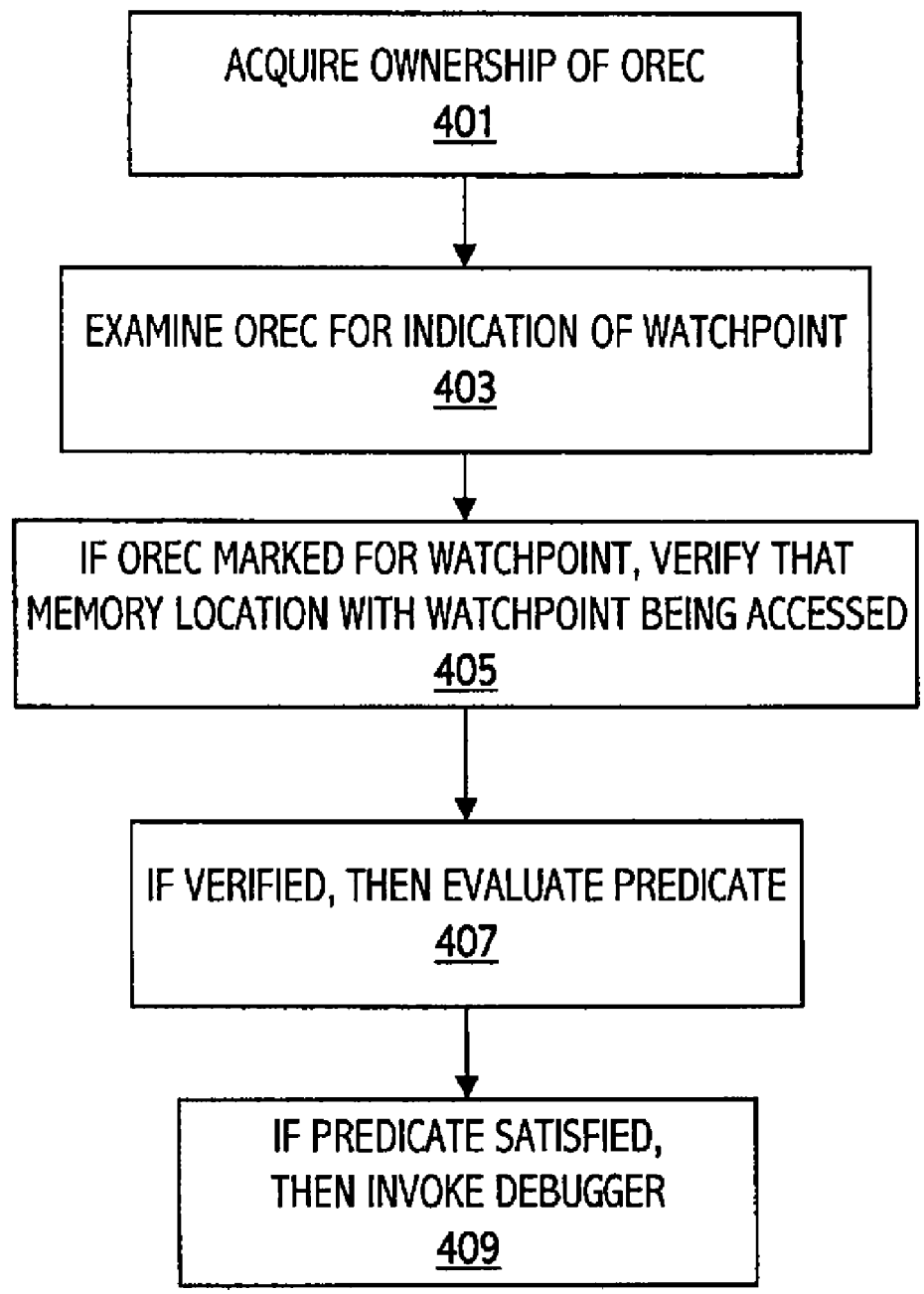
FIG. 4 depicts an example flowchart for a software transaction to handle a watchpoint.

FIG. 4 depicts an example flowchart for a software transaction to handle a watchpoint. At block 401, a software transaction acquires an ownership record. At block 403, the transaction examines the orec to determine if the orec corresponds to a memory location with a watchpoint set on it. At block 405, if the orec has been marked to indicate a watchpoint, then the transaction verifies whether the memory location with the watchpoint is actually being accessed. At block 407, a predicate is evaluated if the watchpoint is verified (and assuming there is a predicate). At block 409, if the predicate is fulfilled, then the debugger is invoked. The example flowchart in FIG. 4 assumes that the debugger is not invoked until verification and evaluation have been completed. However, upon encountering the marking, the debugger may be invoked to perform the verification and the evaluation.

Stopping the program upon access to a watchpoint variable can be done in at least two ways:
1. Immediate-Stop: The debugger can be invoked immediately when the variable is accessed. While this gives the user control at the first time the variable is accessed, it also has a few disadvantages:
    The first value written by the transaction to the variable may not be the actual value finally written by the transaction: the transaction may later change the value written to this variable, or abort without modifying the variable at all. In many cases, the user would not care about these intermediate values of the variable, or about read accesses done by transactions that do not eventually commit.
    Most STM systems do not reacquire ownership of a location if the transaction makes multiple modifications to it. Therefore, if we stop program execution only when the orec is first acquired, we may miss subsequent modifications that establish the predicate we are attempting to detect.
2. Stop-on-Commit: This option overcomes the problems of the immediate-stop approach, by delaying the stopping to the point when the transaction commits. That is, instead of invoking the debugger whenever a marked orec is acquired by a transaction, we instead invoke it when a transaction that owns the orec commits; this can be achieved for example by recording an indication that the transaction has acquired a marked orec when it does so, and then invoking the debugger upon commit if this indication is set. That way the user sees the value actually written to the variable, since at that point no other transaction can abort the triggering transaction anymore. While this approach has many advantages over the immediate-stop approach, it also has the disadvantage that the debugger will not stop on an aborted transaction that tried to modify the variable, which in some cases might be desirable, for example when chasing a slippery bug that rarely occurs. Therefore, it may be desirable to support both options, and allow the user to choose between them. Also, when using the stop-on-commit approach the user cannot see how exactly the written value was calculated by the transaction.

While the above descriptions assume a TM implementation that uses orecs, other techniques can be utilized for different TM implementations. For example, in object-based TM implementations, we can stop on any access to an object since any such access requires opening the object first. The method used for opening an object can be changed to check whether a watchpoint was set on that object. This might be optimized by recording an indication in an object header or handle that a watchpoint has been set on that object. In another example, the debugger starts (but does not complete) a transaction that accesses the variable(s) to be watched. Any transaction that wishes to modify these locations must abort the debugger's transaction, which can trigger the debugger.

Adaptive Watchpoints

In some cases, the user may want to put a watchpoint on a field whose location may dynamically changed. Suppose, for example, that the user is debugging a linked list implementation, and wishes to stop whenever some transaction accesses the value in the first node of the list, or when some predicate involving this value is satisfied. The below code provides an example code for a linked list implementation.

```
class List {
    class Node {
        void* value;
        Node* next;
    };
    ...
    Node* head;
};
```

The challenge is that the address of the field storing the value in the first node of the list is indicated by head->value, and this address changes when head is changed, for example when inserting or removing the first node in the list. In this case, the address of the variable being watched changes. We denote this type of a watchpoint as an adaptive watchpoint.

We can implement an adaptive watchpoint on head->value. When the user asks to put a watchpoint on head->value, the debugger puts a regular watchpoint on the current address of head->value, and a special debugger-watchpoint on the address of head. The debugger-watchpoint on head is special in the sense that it does not give the control to the user when head is accessed. Instead, the debugger cancels the previous watchpoint on head->value coincident with accessing of head, and puts a new watchpoint on the new location of head->value. That is, the debugger uses the debugger-watchpoint on head to detect when the address of the field the user asked to watch is changed, and changes the watchpoint on that field accordingly.

In some cases the debugger might need to put debugger-watchpoints on more than one location, if the address of the field the user asks to watch depends on more than one variable. For example, suppose that the user has asked to watch the variable:

```
DataArr[IndexArr[lastRow,lastColumn]]
```

(where DataArr, IndexArr, lastRow and lastColumn are all transactional variables). Then the debugger should place:
1. A debugger-watchpoint on the address of lastRow.
2. A debugger-watchpoint on the address of lastColumn.
3. A debugger-watchpoint on the address of IndexArr.
4. A debugger-watchpoint on the address of IndexArr[lastRow,lastColumn].
5. A debugger-watchpoint on the address of DataArr.
6. A regular watchpoint on the address of DataArr[IndexArr[lastRow,lastColumn]].

where the only watchpoint that stops the debugger and gives control to the user is the last one. The rest are required so that the debugger will re-evaluate the address of the desired watchpoint(s) whenever it/they might change.

In the general case the debugger places a debugger-watchpoint on every variable that might change the address of the variable the user has asked to watch, and re-evaluates the address of all the watched variables whenever one of them is modified. In some cases though, it would be possible to save some of these reevaluations, like in the above example where a modification of IndexArr[lastRow,lastColumn] can only affect the address of DataArr[IndexArr[lastRow,lastColumn]].

Multi-Variable Conditional Watchpoints

Watching multiple variables together may also be useful when the user would like to condition the watchpoint on more than one variable. For example, a watchpoint may be implemented to stop a program only if the sum of two variables is greater than some value. We denote such a watchpoint as a multi-variable conditional-watchpoint. With such a watchpoint, the user asks the debugger to stop on the first memory modification that satisfies the predicate.

To implement a multi-variable conditional watchpoint, the debugger can place a watchpoint on each of the variables, and evaluate the predicate whenever one of these variables is modified. We denote by the triggering transaction the transaction that caused the predicate evaluation to be invoked. One issue to be considered is that evaluating the predicate requires accessing the other watched variables. There are a variety of ways to achieve this. For example, assume the debugger behaves as follows:

The debugger uses the stop-on-commit approach, so that when a transaction that modifies any of the predicate variables commits, we stop execution either before or after the transaction commits. In either case, we ensure that the transaction still has ownership of all of the orecs it accessed, and we ensure that these ownerships are not revoked by any other threads that continue to run, for example by making the triggering transaction a supertransaction.

When evaluating the predicate, the debugger distinguishes between two kinds of variables: ones that were accessed by the triggering transaction, which we denote as triggering variables, and the rest, which we denote as external variables. Depending on whether execution was stopped before or after the transaction's commit point, triggering variables may be evaluated using the tentative values written by the transaction, or using the recently committed values. External variables might be accessed by using the stopped transaction, or by using another transaction initiated by the debugger. In the latter case, because the triggering transaction is stopped and retains ownership of the orecs it accessed while the new transaction that evaluates the external variables executes, the specified condition can be evaluated atomically.

While reading the external variables, conflicts with other transactions that access these variables may occur. One option is to simply abort the conflicting transaction. However, this may be undesirable, because we may prefer that the debugger has minimal impact on program execution. We describe elsewhere herein techniques for displaying a variable value from a conflicting transaction. Those techniques may be employed here as well.

Delayed Breakpoint

Stopping at a breakpoint and running the program step-by-step affects the behavior of the program, and particularly the timing of interactions between the threads. Placing a breakpoint inside an atomic block may result in even more severe side-effects, because the behavior of atomic blocks may be very sensitive to timing modifications since they may be aborted by concurrent conflicting transactions. These effects may make it difficult to reproduce a bug scenario.

To exploit the benefits of breakpoint debugging while attempting to minimize such effects, we suggest the delayed breakpoint mechanism. A delayed breakpoint is a breakpoint in an atomic block that does not stop the execution of the program until such time as a transaction implementing the atomic block commits. To support delayed breakpoints, rather than stopping program execution when an operation marked with a delayed breakpoint is executed, an indication is made (e.g., a flag is set) that the transaction has hit a delayed breakpoint, and resume execution. Later, upon reaching a commit point, program execution is halted if this indication is set. Besides the advantage of impacting executing timing less, this technique also avoids stopping execution in the case that a transaction executes a breakpoint operation, but then aborts (either explicitly or due to a conflict with another transaction). In many cases, it will be preferable to only stop at a breakpoint in a transaction that subsequently commits.

Figure 5A:
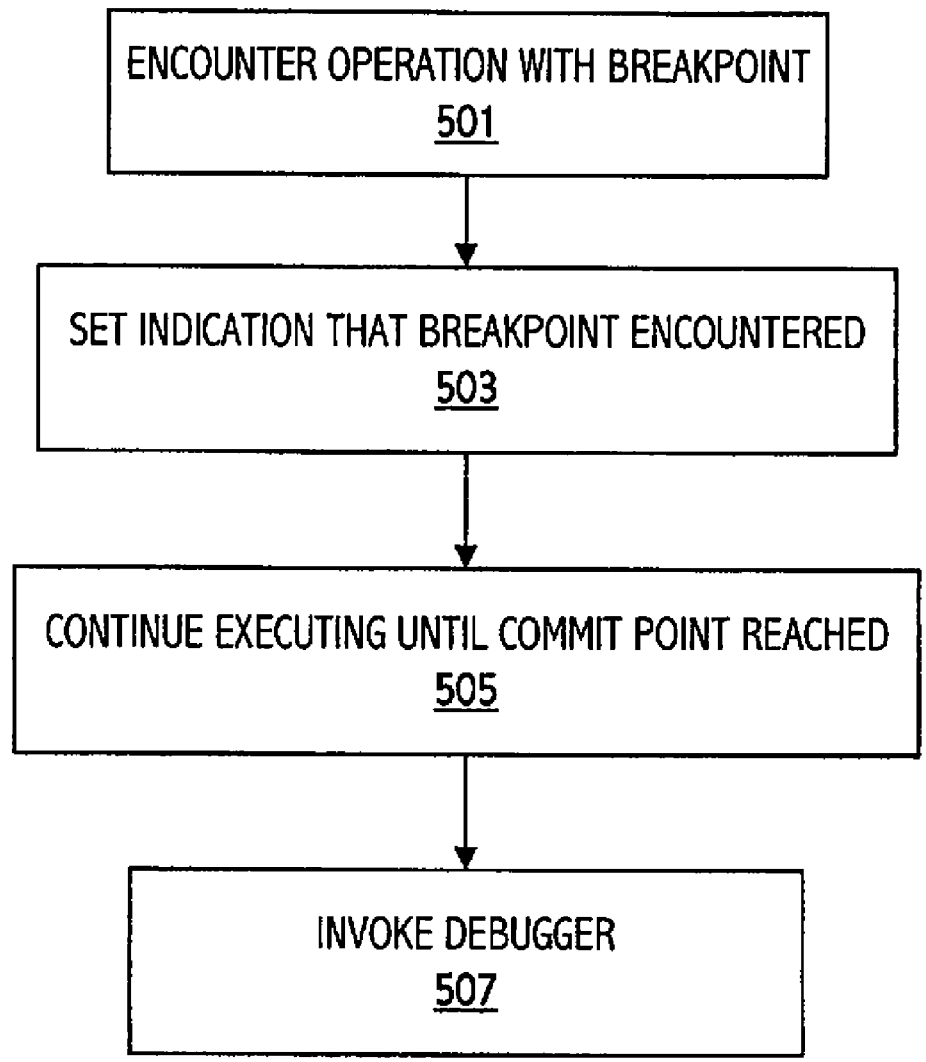
FIGS. 5A and 5B depict flowcharts for delayed breakpointing.

FIG. 5A depicts a flowchart for delayed breakpointing. At block 501, a transaction encounters an operation with a delayed breakpoint. Coincident with execution of the operation, an indication is set that the delayed breakpoint has been encountered at block 503. At block 505, execution is resumed and continues until the transaction at least reaches a commit point. At block 507, the debugger is invoked.

The point in the program where execution is halted due to the delayed breakpoint having been encountered by a transaction may vary. One simple type of a delayed breakpoint stops on the operation following the atomic block if the transaction implementing the atomic block hit the breakpoint operation in the atomic block. This kind of delayed breakpoint can be implemented even when the transaction executing the atomic block is done using HTM, without requiring any special support from the underlying HTM implementation. The debugger simply replaces the breakpoint-operation in the HTM-based implementation to branch to a piece of code that executes that operation, and raises a flag indicating that the execution should stop on the operation following the atomic block. This simple approach has the disadvantage that the values written by the atomic block may have already been changed by other threads when execution stops, so the user may see a state of the world which might be very different than when the breakpoint operation was encountered. Moreover, if the transaction is executed in hardware, then unless there is specific hardware support for this purpose, the user would not be able to get any information about the transaction execution (like which values were read/written, etc.).

Figure 5B:
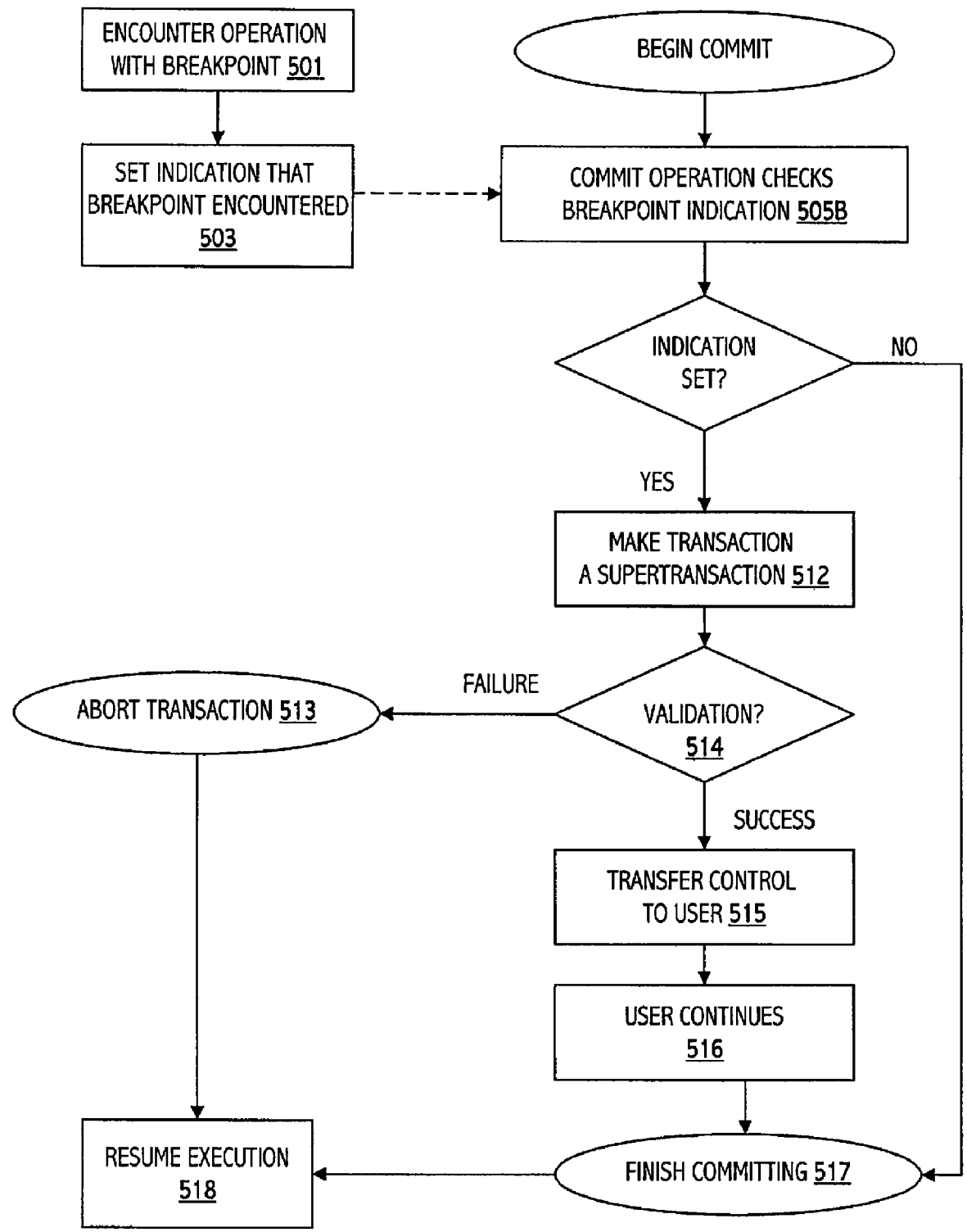

On the other hand, if the atomic block is executed by a software transaction, we can have a more powerful type of a delayed breakpoint, which stops at the commit point of the executing transaction. More precisely, the debugger tries to stop at a point during the commit operation of that transaction at which the transaction is guaranteed to commit successfully and at which no other transaction has seen its effects on memory. FIG. 5B depicts one such flow. For example, the commit operation checks (505B) the flag that indicates if a delayed-breakpoint placed in the atomic block was hit by the transaction, and if so, it does the following:

1. Make the transaction a super-transaction (at 512).
2. Validate (514) the transaction. That is, make sure that the transaction can commit. If validation fails, abort the transaction (513), fail the commit operation, and resume execution (at 518).
3. Give control to the user (at 515).
4. When the user asks (516) to continue execution, finish committing the transaction (at 517). Note that, depending on how super-transactions are supported, a lightweight commit may be applicable here if we can be sure that the transaction cannot be aborted after becoming a super-transaction.

In the implementation described, steps 1 and 2 guarantee that all future conflicts will be resolved in favor of the transaction that hit the breakpoint. Thereafter, control is given to the user, who can subsequently decide to commit the transaction.

Depending on the interaction between the TM's contention management mechanism and the mechanism that supports super-transactions, it may not be possible to absolutely prevent the transaction from being aborted. For example, another transaction may already have acquired permission from the contention manager to abort the transaction when the debugger requests to make it a super-transaction. Versioning can be employed to avoid this situation. Each transaction maintains a version number together with its status word. To abort a transaction T, another transaction T1 generally attempts to modify the status of T from active to aborted. If the contention manager is implemented to provide a version number for aborting a transaction when giving permission to abort that transaction, then a transaction can change the version number in its status word so that transactions that have previously received permission to abort it can no longer do so. To revoke its super-transaction status, the transaction would then communicate its new status version number to the contention manager, so that it could again give effective permission to abort the transaction. A variety of alternatives, variations, and extensions will be apparent to persons skilled in the art.

When the debugger stops the execution of the commit operation and gives control to the user, the user gets to know that a committed execution of the atomic block has hit the delayed breakpoint. At that point, the user can view various variables, including the one accessed by the transaction, to try to understand the effect of that execution.

When using HyTM, we can have the simple delayed breakpoint (that stops after the atomic block) on the HTM-based implementation and the more powerful delayed breakpoint on the STM-based one. Another option is to execute the atomic block using the HTM-based implementation, and only in the case that the breakpoint-operation is hit, abort the hardware transaction and switch to the STM-based implementation, where the more powerful delayed breakpoint can be used.

Atomic Groups with Delayed Breakpointing

If a user views variables not accessed by the transaction, the values seen are at the time the debugger stops rather than the time of the breakpoint-operation execution. Therefore, it may be useful to combine the delayed breakpoint mechanism with the atomic group feature. With this combination, the user can associate with the delayed breakpoint an atomic group of variables whose value should be recorded when the delayed breakpoint operation is executed. When the delayed breakpoint operation is hit, besides triggering a breakpoint at the end of the transaction, the debugger gets the atomic group's value, and presents it to the user when, and if, it later stops in the transaction's commit phase.

Replay Debugging

When the debugger stops at a breakpoint, it is often useful for the user to be able to see the last few steps of the execution that led to the breakpoint operation. Supporting such a feature usually requires maintaining some kind of a log that starts recording a few steps before the breakpoint is hit. Some STM implementations can allow the debugger to replay the whole execution of a transaction and to show the user how control reached the breakpoint operation. The replay feature is especially useful when combined with the delayed breakpoint mechanism. We will show that this combination will allow the user to place a delayed breakpoint in an atomic block, and then debug step-by-step either from the point of the breakpoint operation or from the beginning of the atomic block by replaying the transaction's execution. That way the users get the benefits of not breaking the execution of the atomic block, but can still see the execution as if they have stopped inside that block and debugged step-by-step.

Replay debugging leverages attributes of transactional memory. Since a transaction is atomic, each variable a transaction accesses cannot be modified after that access and until the transaction commits. Therefore, the value of a variable seen by a transaction at each point of its execution is either the last value it wrote there, or the value read on the first access to this variable by the transaction (i.e., pre-transaction value). Values written to a variable while replaying the execution of an atomic block can be tracked. The pre-transaction value of each variable accessed by the transaction is utilized in order to infer the outcome of all its memory accesses. Since the debugger can infer the outcome of all memory accesses done by the execution of the atomic block, it can reconstruct that execution and display it to the user.

Some STM implementations already keep track of the pre-transaction value of the variables accessed. For example, some implementations maintain a read-set that contains the pre-transactional values, while storing the tentative values in-memory (until commit time). Others maintain a write-set, where the tentative values are stored, leaving the pre-transactional values in-memory (until commit-time). The minimum support required from the STM system in order to replay the transaction is access to these pre-transactional values. By having the ability to access the read set, we can implement the replay procedure as follows:

- The debugger maintains its own write-set for the transaction. An entry in this write set consists of an address and a value. The replay begins with an empty write set.
- The replay procedure executes all operations that are not STM-library function-calls as usual.
- The replay procedure ignores all STM library function calls except the ones that implement the transactional read/write operations.
- When the replay procedure reaches a transactional write operation, it writes the value in the write set maintained by the debugger.
- When the replay procedure reaches a transactional read operation, it first searches the value for the address read in the write set maintained by the debugger. If the value is there, this is the returned value of that transactional read operation. Otherwise, the return value is the pre-transactional value.

Figure 6:
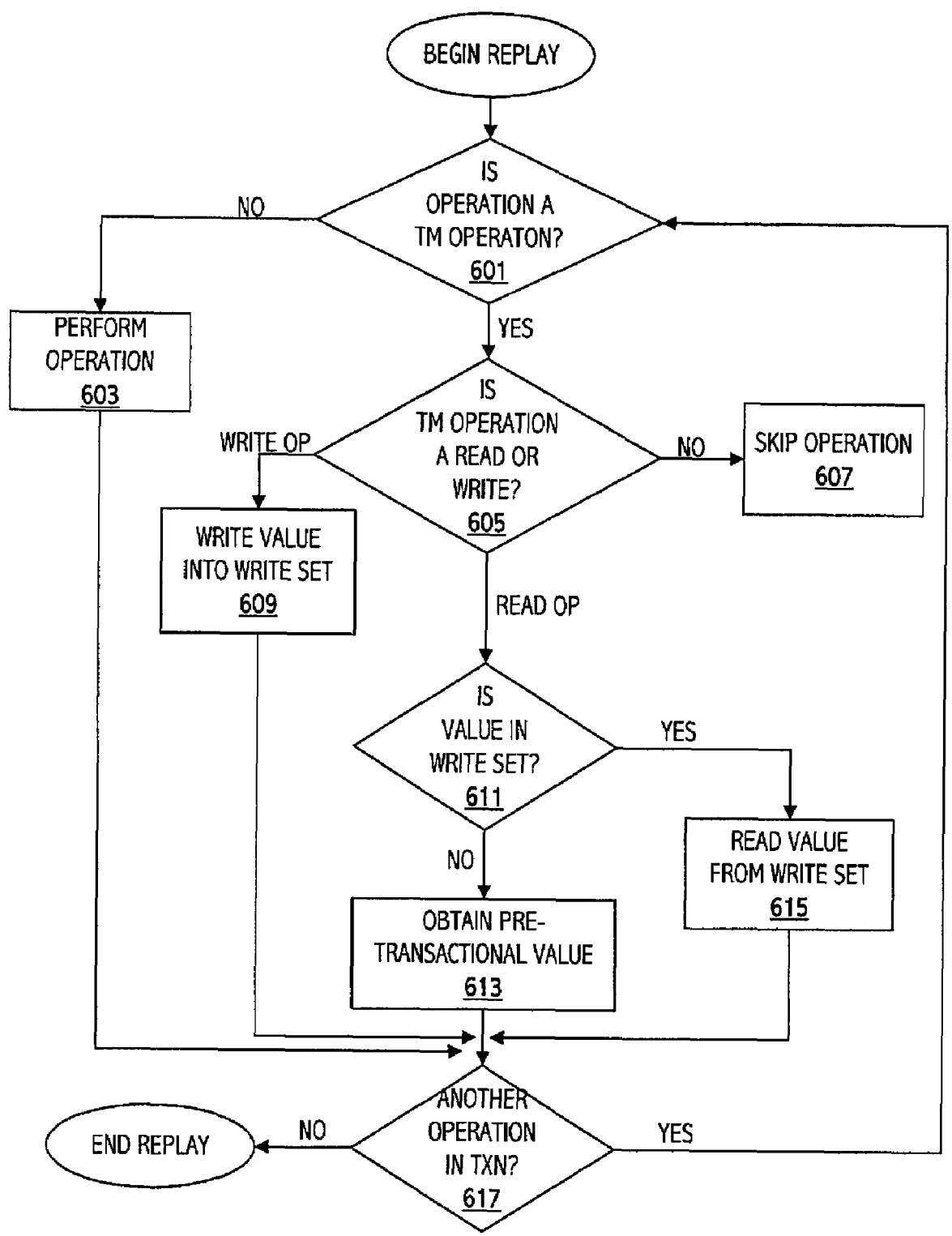
FIG. 6 depicts an example flowchart for replay debugging.

FIG. 6 depicts an example flowchart for replay debugging. At block 601, it is determined whether an operation is a transactional memory operation (e.g., a call to a method or function in a STM library). If the operation is a transactional memory operation, then control flows to block 605. If the operation is not a transactional memory operation, then control flows to block 603.

At block 603, the operation is performed. Control flows from block 603 to block 617.

At block 605, it is determined if the transactional memory operation is a read or a write operation. If the transactional memory operation is a read operation, then control flows to block 611. If the transactional memory operation is a write operation, then control flows to block 609. If the transactional memory operation is neither a read nor a write operation, then control flows to block 607, where the operation is skipped.

At block 609, the write operation writes a value into the write set maintained by the debugger. Control flows from block 609 to block 617.

At block 611, it is determined if the memory location of the read operation is represented in the write set. If the memory location is represented in the write set, then a value is read from the write set at block 615. If the memory location is not represented in the write set, then the value is read from a read set at block 613. Control flows from both blocks 613 and 615 to block 617. At block 617, it is determined if there is another operation to be replayed in the atomic block. If there is another operation, then control flows back to block 601. If not, then replay ends. Of course, those of ordinary skill in the art will appreciate that the user may be prompted for additional replay, modification of variables, etc.

The debugger may also provide the user with the ability to abort the transaction and retry it or skip it. In replay mode, however, rather than aborting the transaction, it may be preferable to simply restart its execution from the beginning, while still maintaining ownership of memory locations accessed by the transaction. This way, the user can repeatedly restart the transaction and observe its execution. This option also allows the debugger to provide the user with the ability to modify some memory locations while replaying, and observe the execution of the transaction with the new values. This can be done as follows: when the user asks to change a value of a variable read by the atomic block during the replay, the debugger restarts the transaction (while maintaining the ownership on the memory location accessed), run up to the point where the user asked for the change, and then use the transaction to make that memory modification. The user can then continue to debug step by step as with usual breakpoints. Supporting these features would require some straightforward modifications to the STM implementation, to allow a transaction to be restarted without releasing any ownerships it has acquired.

Several variations are apparent. For example, it may be useful to support delayed breakpoints with automatic replay up to the point of the breakpoint, so that the user sets a delayed breakpoint, and the debugger appears to stop at that breakpoint, even though the transaction has already been executed to its commit point. The user can then step through the remainder of the atomic block as with regular step-by-step debugging.

An atomic block is transactionally-deterministic if the execution of this block is uniquely determined by the values it reads from memory. The replay process works correctly for transactionally-deterministic atomic blocks, because it relies on the fact that the execution of the block does not change as long as it reads the same values from the memory. Naturally, most atomic blocks are transactionally-deterministic. The user should be aware, though, that for non transactionally-deterministic atomic blocks the replay process may fail to repeat the same execution path taken by the original execution, and that the execution path displayed may not even reach the breakpoint-instruction on which the debugger has stopped. It may be desirable to provide an indication to the user that this might happen in the case that the compiler cannot prove that the breakpointed atomic block is transactionally deterministic.

The described embodiments may be provided as a computer program product, or software, possibly encoded in a machine-readable medium as instructions used to program a computer system (or other electronic device) to perform a process in accordance with embodiments described herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 7:
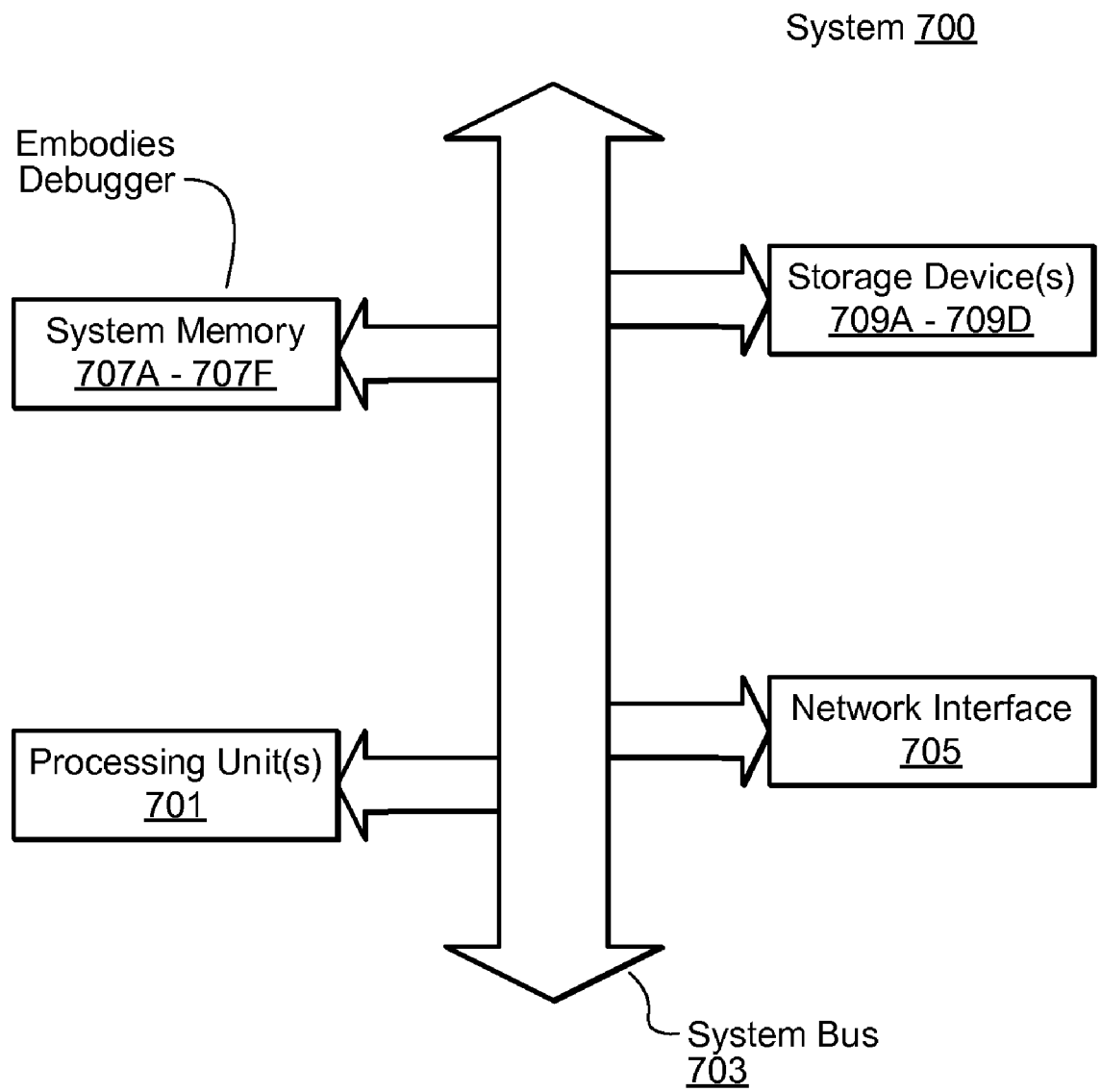
FIG. 7 depicts an example computer system.

FIG. 7 depicts an example computer system. A computer system 700 includes processing unit(s) 701 (e.g., single processing unit, multiple cores on a single chip, multiple cores on multiple chips, etc.). The computer system 700 also includes a system memory 707A-707F. The system memory may include one or more of cache, SRAM, DRAM, RDRAM, EDO RAM, DDR RAM, EEPROM, etc.). The computer system 700 further includes a system bus 703 (e.g., LDT, PCI, ISA, etc.), a network interface 705 (e.g., an ATM interface, an Ethernet interface, a Frame Relay interface, etc.), and a storage device(s) 709A-709D (e.g., optical storage, magnetic storage, etc.). Realizations may include fewer or additional components not illustrated in FIG. 7 (e.g., video cards, audio cards, additional network interfaces, peripheral devices, etc.). The system memory 707A-707F embodies a debugger that includes at least one of the features described above (i.e., breakpoint for TM representation of code, delayed breakpointing, replay debugging of TM representation of code, watchpoints on transactional variables, viewing and/or modifying transactional variables, atomic groups, etc.). All or a portion of the described functionality for such a debugger may be embodied in the system memory 707A-707F. At least some of the functionality may be implemented in the processing unit 701 and/or a co-processing unit not depicted.

While embodiments have been described with reference to various realizations, it will be understood that these realizations are illustrative and that the scope of the invention is not limited to them. Many variations, modifications, additions, and improvements are possible. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of debugging a transactional memory based representation of a code in a multi-threaded, transactional memory system, the method comprising:
   setting a breakpoint on an operation in an atomic block of the transactional memory based code representation;
      wherein the atomic block comprises a plurality of memory operations to a shared memory; and
      wherein the system is configured to execute the atomic block atomically with respect to an other concurrent thread of execution having access to the shared memory; and
   directing execution to a first code path instead of a second code path for the atomic block due to the breakpoint.

2. The method of claim 1, wherein the directing executing is coincident with one of determining that the breakpoint has been set in the atomic block and encountering the breakpoint during execution of the atomic block.

3. The method of claim 1, wherein execution is directed to the first code path only if the operation with the set breakpoint is executed.

4. The method of claim 1, wherein the directing comprises modifying the transactional memory based representation to disable the second code path.

5. The method of claim 4, wherein the modifying is limited to the atomic block with the breakpoint and does not affect atomic blocks without breakpoints.

6. The method of claim 1, wherein the first code path comprises one of a hardware transactional memory based code path and a software transactional memory based code path.

7. The method of claim 1 further comprising:
   halting execution of the transactional memory based representation of the code due to the breakpoint; and
   indicating correspondence between a unit of the code and the atomic block in which the breakpoint is set.

8. The method of claim 1 further comprising stepping through the atomic block, the atomic block including at least one transactional memory operation, and preventing stepping into the at least one transactional memory operation to conceal a definition thereof.

9. The method of claim 8, wherein transaction of the atomic block with the breakpoint wins any conflicts with other transactions, at least during debugging of the transactional memory based representation.

10. The method of claim 9, wherein the other atomic block instantiations either execute synchronously or asynchronously with the halted atomic block instantiation.

11. The method of claim 1 further comprising executing a transactional memory abort operation to skip or retry the atomic block.

12. The method of claim 1 further comprising switching from debugging an instantiation of the atomic block to debugging another atomic block instantiation.

13. A computer program product encoded in one or more machine-readable storage media, the computer program product comprising:
   a first sequence of instructions executable to set a breakpoint on an operation in an atomic block of a transactional memory based representation of a code, in a multithreaded, transactional memory system;
      wherein the atomic block comprises a plurality of memory operations to a shared memory; and
      wherein the system is configured to execute the atomic block atomically with respect to an other concurrent thread of execution having access to the shared memory; and
   a second sequence of instructions executable to modify a transactional memory based representation of a code to direct execution of a transaction of an atomic block, with a breakpoint set by the first sequence of instructions, from a first code path to a second code path.

14. The computer program product of claim 13, wherein the second sequence of instructions executable to modify comprises the second sequence of instructions being executable to disable the first code path.

15. The computer program product of claim 14, wherein the second sequence of instructions being executable to disable the first code path comprises the second sequence of instructions being executable to employ a software implementation of a transactional memory operation instead of a hardware implementation of the transactional memory operation.

16. The computer program product of claim 14, wherein the second sequence of instructions being executable to disable the first code path comprises the second sequence of instructions being executable to modify the transactional memory based representation of the code to unconditionally branch to the second code path during execution of the atomic block.

17. The computer program product of claim 14, wherein the second sequence of instructions being executable to disable the first code path comprises the second sequence of instructions being executable to:
   remove from the transactional memory based representation of the code a call to a code unit that determines whether to employ a hardware implementation of a transactional memory operation or a software implementation of the transactional memory operation, and
   modify the transactional memory based representation to direct an instantiation of an atomic block to the software implementation of the transactional memory operation.

18. The computer program product of claim 17, wherein the second sequence of instructions executable to disable the first code path comprises the second sequence of instructions being executable to:
   insert a transactional memory abort operation into the first code path; and
   replace a call to a code unit corresponding to the first code path with a call to a code unit corresponding to the second code path.

19. The computer program product of claim 13 further comprising a third sequence of instructions executable to step through an atomic block and executable to indicate a self-abort if an instantiation of the atomic block self-aborts while stepping through the atomic block.

20. The computer program product of claim 19, wherein the third sequence of instructions are further executable to prevent stepping into a transactional memory operation of the atomic block.

21. The computer program product of claim 13 further comprising a fourth sequence of instructions executable to determine whether an atomic block instantiation is still viable coincident with encountering a breakpoint, and executable to cause the breakpoint to be ignored if the atomic block instantiation is no longer viable.

22. The computer program product of claim 13 further comprising a third sequence of instructions executable to execute a transactional memory abort operation to skip an atomic block instantiation or retry an atomic block instantiation.

23. An apparatus comprising:
- a set of one or more processors operable to execute an atomic block in a transactional memory based representation of a code;
  - wherein the atomic block comprises a plurality of memory operations to a shared memory; and
  - wherein the set of one or more processors are configured to execute the atomic block atomically with respect to an other concurrent thread of execution having access to the shared memory; and
- means for directing execution of the atomic block from a code path of a first transactional memory implementation type to a code path of a second transactional memory implementation type for the atomic block, dependent, at least in part, on a breakpoint set in the atomic block.

24. The apparatus of claim 23 further comprising means for setting the breakpoint in the atomic block.

25. The apparatus of claim 23 further comprising means for switching from an instantiation of the atomic block to another atomic block instantiation during debugging of the transactional memory based representation of the code.

* * * * *

UNITED STATES PATENT AND TRADEMARK OFFICE
CERTIFICATE OF CORRECTION

PATENT NO. : 7,620,850 B2
APPLICATION NO. : 11/552884
DATED : November 17, 2009
INVENTOR(S) : Lev et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 420 days.

Signed and Sealed this

Twenty-sixth Day of October, 2010

David J. Kappos
*Director of the United States Patent and Trademark Office*